(12) United States Patent
Rose

(10) Patent No.: US 11,072,377 B2
(45) Date of Patent: Jul. 27, 2021

(54) REMOVABLE FAIRING

(71) Applicant: Lund, Inc., Buford, GA (US)

(72) Inventor: Brent Lorenz Rose, Jefferson, GA (US)

(73) Assignee: Lund, Inc., Buford, GA (US)

( * ) Notice: Subject to any disclaimer, the term of this patent is extended or adjusted under 35 U.S.C. 154(b) by 147 days.

(21) Appl. No.: 16/557,207

(22) Filed: Aug. 30, 2019

(65) Prior Publication Data

US 2020/0070902 A1 Mar. 5, 2020

Related U.S. Application Data

(60) Provisional application No. 62/726,942, filed on Sep. 4, 2018.

(51) Int. Cl.
*B62D 35/00* (2006.01)
*F16B 2/16* (2006.01)

(52) U.S. Cl.
CPC .............. *B62D 35/001* (2013.01); *F16B 2/16* (2013.01)

(58) Field of Classification Search
CPC ................................ B62D 35/001; F16B 2/16
See application file for complete search history.

(56) References Cited

U.S. PATENT DOCUMENTS

| | | | |
|---|---|---|---|
| 2,538,839 A | 1/1951 | Limberg | |
| 2,605,119 A | 7/1952 | Earnest | |
| 2,869,929 A | 1/1959 | Hurd | |
| 3,006,658 A | 10/1961 | Wenham et al. | |
| 3,078,124 A | 2/1963 | Harry | |
| 3,092,420 A | 6/1963 | Baldwin et al. | |
| 3,317,247 A | 5/1967 | Lamme | |
| 3,367,722 A | 2/1968 | Miyanaga | |
| 3,585,824 A | 6/1971 | Schenk | |
| 3,874,697 A | 4/1975 | Thompson | |
| 3,918,764 A | 11/1975 | Lamme | |
| 3,954,281 A | 5/1976 | Juergens | |
| 4,138,129 A | 2/1979 | Morris | |
| 4,169,608 A | 10/1979 | Logan | |
| 4,180,230 A | 12/1979 | Sogoian | |

(Continued)

FOREIGN PATENT DOCUMENTS

| | | |
|---|---|---|
| AU | 2013 337652 B2 | 5/2017 |
| BR | 198400012 A | 8/1984 |

(Continued)

OTHER PUBLICATIONS

U.S. Appl. No. 61/721,314, filed Nov. 1, 2012, Butler et al.

(Continued)

*Primary Examiner* — Lori L Lyjak

(74) *Attorney, Agent, or Firm* — Knobbe, Martens, Olson & Bear, LLP

(57) ABSTRACT

A fairing assembly for a vehicle and methods for mounting and removing portions of the fairing assembly are provided. The fairing assembly may be easily removed while a user is on the roadside. The fairing assembly may include a fairing, a lock, and a support coupled to a vehicle. The lock may be (Continued)

removably coupled to the support to allow for mounting and removal of the fairing when the lock is in an unlocked configuration. The support may include a plurality of mounting positions. The fairing and lock may be slid between mounting positions in the unlocked configuration. In a locked configuration, the lock may be engaged in a particular mounting position.

11 Claims, 8 Drawing Sheets

(56) References Cited

U.S. PATENT DOCUMENTS

| | | | |
|---|---|---|---|
| 4,235,476 A | 11/1980 | Arvidsson | |
| 4,334,694 A | 6/1982 | Iwanicki | |
| 4,406,491 A | 9/1983 | Forster | |
| 4,627,631 A | 12/1986 | Sherman | |
| 4,640,541 A | 2/1987 | FitzGerald et al. | |
| 4,706,980 A | 11/1987 | Hawes et al. | |
| 4,730,952 A | 3/1988 | Wiley | |
| 4,735,428 A | 4/1988 | Antekeier | |
| 4,740,003 A | 4/1988 | Antekeier | |
| 4,761,040 A | 8/1988 | Johnson | |
| 4,784,430 A | 11/1988 | Biermacher | |
| 4,836,568 A | 6/1989 | Preslik | |
| 4,889,394 A | 12/1989 | Ruspa | |
| 4,921,276 A | 5/1990 | Morin | |
| 4,925,235 A | 5/1990 | Fingerle | |
| D312,609 S | 12/1990 | Preslik et al. | |
| D312,810 S | 12/1990 | Preslik et al. | |
| 4,974,909 A | 12/1990 | Patti et al. | |
| 4,984,851 A | 1/1991 | Hayano | |
| 5,074,573 A | 12/1991 | Dick | |
| 5,190,354 A | 3/1993 | Levy | |
| 5,192,108 A | 3/1993 | Richardson et al. | |
| 5,238,268 A | 8/1993 | Logan | |
| 5,257,822 A | 11/1993 | Metcalf | |
| 5,263,770 A | 11/1993 | Goudey | |
| 5,269,547 A | 12/1993 | Antekeier | |
| 5,280,990 A | 1/1994 | Rinard | |
| 5,286,049 A | 2/1994 | Khan | |
| D345,332 S | 3/1994 | Roman | |
| 5,294,189 A | 3/1994 | Price et al. | |
| 5,324,099 A | 6/1994 | Fitzhugh | |
| 5,340,154 A | 8/1994 | Scott | |
| 5,366,278 A | 11/1994 | Brumfield | |
| 5,375,882 A | 12/1994 | Koch, III | |
| D361,974 S | 9/1995 | Hornik | |
| 5,490,342 A | 2/1996 | Rutterman et al. | |
| 5,609,384 A | 3/1997 | Loewen | |
| 5,623,777 A | 4/1997 | Hsiao et al. | |
| D381,949 S | 8/1997 | Barrett, Jr. et al. | |
| 5,659,989 A | 8/1997 | Hsiao et al. | |
| 5,735,560 A | 4/1998 | Bowen et al. | |
| D395,268 S | 6/1998 | Tucker | |
| 5,788,321 A | 8/1998 | McHorse et al. | |
| 5,791,741 A | 8/1998 | Sheu | |
| 5,833,254 A | 11/1998 | Bucho | |
| 5,836,399 A | 11/1998 | Maiwald et al. | |
| 5,850,727 A | 12/1998 | Fox | |
| 5,871,335 A | 2/1999 | Bartlett | |
| 5,884,981 A | 3/1999 | Ichikawa | |
| 5,921,617 A | 7/1999 | Loewen et al. | |
| 5,938,222 A | 8/1999 | Huang | |
| 5,947,520 A | 9/1999 | McHorse | |
| 6,007,102 A | 12/1999 | Helmust | |
| 6,045,195 A | 4/2000 | Okamoto | |
| 6,070,893 A | 6/2000 | Thorndyke et al. | |
| 6,070,908 A | 6/2000 | Skrzypchak | |
| 6,079,769 A | 6/2000 | Fannin et al. | |
| 6,120,104 A | 9/2000 | Okamoto et al. | |
| 6,152,469 A | 11/2000 | Gadowski | |
| 6,219,987 B1 | 4/2001 | Trent et al. | |
| 6,367,841 B1 | 4/2002 | Matthew | |
| 6,412,799 B1 | 7/2002 | Schrempf | |
| 6,416,112 B1 | 7/2002 | Trivits | |
| 6,431,605 B1 | 8/2002 | Miller et al. | |
| 6,435,462 B2 | 8/2002 | Hawes | |
| 6,443,492 B1 | 9/2002 | Barr et al. | |
| 6,644,720 B2 | 11/2003 | Long et al. | |
| 6,648,373 B2 | 11/2003 | Hawes | |
| 6,666,498 B1 | 12/2003 | Whitten | |
| 6,755,460 B1 | 6/2004 | Marrs et al. | |
| 6,786,512 B2 | 9/2004 | Morin et al. | |
| 6,857,709 B1 | 2/2005 | McLean et al. | |
| 6,886,862 B2 | 5/2005 | Matthew | |
| 6,979,050 B2 | 12/2005 | Browne et al. | |
| 7,011,428 B1 | 3/2006 | Hand | |
| 7,081,081 B2 | 7/2006 | Schütz et al. | |
| 7,083,179 B2 | 8/2006 | Chapman et al. | |
| 7,131,705 B1 | 11/2006 | DelVecchio et al. | |
| 7,249,804 B2 | 7/2007 | Zank et al. | |
| 7,484,736 B2 | 2/2009 | Allemann et al. | |
| 7,520,534 B2 | 4/2009 | Longchamp | |
| 7,547,076 B2 | 6/2009 | Necaise | |
| 7,637,563 B2 | 12/2009 | Plett et al. | |
| D607,200 S | 1/2010 | Prater | |
| 7,669,678 B2 | 3/2010 | Benedict et al. | |
| 7,775,374 B1 | 8/2010 | Barker et al. | |
| 7,775,604 B2 | 8/2010 | Chen | |
| 7,806,464 B2 | 10/2010 | Cardolle | |
| 7,810,829 B2 | 10/2010 | Hawes | |
| 7,909,343 B2 | 3/2011 | Archer et al. | |
| 7,931,302 B2 | 4/2011 | Vaughn | |
| 7,942,466 B2 | 5/2011 | Reiman et al. | |
| 8,011,848 B2 | 9/2011 | Sockman | |
| 8,118,329 B2 | 2/2012 | Braga | |
| 8,207,693 B2 | 6/2012 | Hauser et al. | |
| 8,210,599 B2 | 7/2012 | Butler | |
| 8,251,436 B2 | 8/2012 | Henderson et al. | |
| 8,342,595 B2 | 1/2013 | Henderon et al. | |
| 8,450,953 B2 | 5/2013 | Hauser et al. | |
| 8,602,466 B2 | 12/2013 | Barron | |
| 8,814,253 B1 | 8/2014 | Butler et al. | |
| 9,027,983 B2 | 5/2015 | Butler et al. | |
| 9,327,550 B2 | 5/2016 | Butler et al. | |
| 9,440,689 B1 | 9/2016 | Smith et al. | |
| 9,488,145 B2 | 11/2016 | Butler et al. | |
| 9,540,054 B2 | 1/2017 | Butler et al. | |
| 9,663,157 B2 | 5/2017 | Butler et al. | |
| 2004/0164539 A1 | 8/2004 | Bernard | |
| 2005/0088013 A1 | 4/2005 | Dyer, II et al. | |
| 2008/0029989 A1 | 2/2008 | Griffiths | |
| 2008/0129079 A1 | 6/2008 | Plett et al. | |
| 2009/0212595 A1 | 8/2009 | Heppel et al. | |
| 2009/0273176 A1 | 11/2009 | Ulgen | |
| 2010/0066123 A1 | 3/2010 | Ortega et al. | |
| 2010/0066155 A1 | 3/2010 | Seradarian et al. | |
| 2010/0117396 A1 | 5/2010 | Dayton | |
| 2011/0057410 A1 | 3/2011 | Eklund et al. | |
| 2011/0067082 A1 | 3/2011 | Walker | |
| 2011/0089748 A1 | 4/2011 | Grill et al. | |
| 2011/0101767 A1 | 5/2011 | Fleck | |
| 2012/0013146 A1 | 1/2012 | Wolf et al. | |
| 2012/0074728 A1 | 3/2012 | Senatro | |
| 2012/0169086 A1 | 7/2012 | Giromini et al. | |
| 2012/0217712 A1 | 8/2012 | Kuttner et al. | |
| 2012/0248799 A1 | 10/2012 | Barron | |
| 2012/0298814 A1 | 11/2012 | Dixon | |
| 2013/0015698 A1 | 1/2013 | Butler et al. | |
| 2013/0049320 A1 | 2/2013 | Smith | |
| 2013/0154228 A1 | 6/2013 | Ducroquet | |
| 2013/0257317 A1 | 10/2013 | Hauser et al. | |
| 2014/0117712 A1 | 5/2014 | Butler et al. | |
| 2014/0232133 A1 | 8/2014 | He et al. | |
| 2015/0354429 A1 | 12/2015 | Thompson et al. | |
| 2016/0031409 A1 | 2/2016 | Barron | |

(56) References Cited

U.S. PATENT DOCUMENTS

2016/0207352 A1 7/2016 Butler et al.
2017/0217507 A1 8/2017 Butler et al.

FOREIGN PATENT DOCUMENTS

| CA | 2877482 A1 | 1/2013 |
|---|---|---|
| CA | 2890183 A1 | 5/2014 |
| CN | 104884291 A | 9/2015 |
| CN | 104968909 A | 10/2015 |
| DE | 25 37 217 C2 | 3/1985 |
| DE | 10 2009 030347 | 12/2010 |
| EP | 0 051 093 | 5/1982 |
| EP | 0 309 611 | 4/1989 |
| EP | 0 310 130 | 12/1992 |
| EP | 1 966 034 B1 | 7/2009 |
| EP | 2 731 805 A4 | 4/2015 |
| EP | 2 947 292 | 11/2015 |
| EP | 2 826 972 B1 | 4/2016 |
| EP | 2 914 477 A4 | 11/2016 |
| EP | 2 934 933 B1 | 2/2017 |
| EP | 3 165 736 | 5/2017 |
| FR | 2880324 | 7/2006 |
| GB | 1 528 108 | 10/1978 |
| HK | 1215229 | 8/2016 |
| IN | 2015 05169 P4 | 7/2016 |
| JP | H01111577 A | 4/1989 |
| JP | 3138383 U | 12/2007 |
| JP | 2012-056499 | 3/2012 |
| KR | 2015 098656 | 8/2015 |
| WO | WO 1997/048590 | 12/1997 |
| WO | WO 2009/105631 | 8/2009 |
| WO | WO 2013/009729 | 1/2013 |
| WO | WO 2014/095601 | 6/2014 |
| WO | WO 2014/071220 A3 | 7/2014 |
| WO | WO 2015/165922 | 11/2015 |
| WO | WO 2017/077002 | 5/2017 |

OTHER PUBLICATIONS

U.S. Appl. No. 61/746,386, filed Dec. 27, 2012, Butler et al.
AMP Research Power StepTM, AMP Research, Tustin, CA, at www.amp-research.com, printed Jul. 24, 2012, 6 pgs.
Bresnan, John, "Exterior Accessories," May 11, 2012, 23 pgs., Drink Water Trailer Sales, Pembroke, MA, at http://www.drinkwaterts.com, printed Jul. 25, 2012, 23 pgs.
Deflecktor, The First-Of-Its-Kind Aerodynamic Wheel Cover web site pages, 15 pgs., A de F, Ltd. Headquarters, Birchwood, MN, at http://www.deflecktor.com/DeflecktorBroshure.pdf.
Discount Auto Parts Dee Zee Running Boards Car Truck SUV, Dee Zee, Inc., Des Moines, IA, at www.running-board.nedona.org, printed Jul. 24, 2012, 6 pgs.
Endeavor Running Boards, 4WheelOnline.com, Tampa, FL, at http://4wheelonline.com, printed Jul. 28, 2012, 2 pgs.
Isuzu Splash Shield/Mud Flap #1577, Product Information Page (online), Busbee's Trucks & Parts, 2009-2012 [retrieved on Feb. 25, 2014] at <<http://www.busbeetruckparts.com/truck-part-categories/splash-shields/isuzu-npr-splash-shieldmud-flap-1989-used>>, 1 pg.
Lund Trailrunner Extruded Aluminum Running Boards, JC Whitney, LaSalle, IL, at www.jcwhitney.com, printed on Jul. 25, 2012, 3 pgs.
TrailBack Aluminum Running Boards, BuyAutoTruckAccessories.com, Clifton, NJ, at www.buyautotruckaccessories.com, printed Jul. 24, 2012, 2pgs.
"Truck Accessories," Council Hitch Truck Accessories, Council Bluffs, IA at http://councilhitch.com, printed Jul. 24, 2012, 1 pg.
"Truck Accessories," Council Hitch Truck Accessories, Council Bluffs, IA at http://councilhitch.com, printed May 15, 2013, 5 pgs.

REMOVABLE FAIRING

INCORPORATION BY REFERENCE

Any and all applications for which a foreign or domestic priority claim is identified in the Application Data Sheet as filed with the present application are hereby incorporated by reference under 37 CFR 1.57.

This application claims a priority benefit under at least 35 U.S.C. § 119 to U.S. Patent Application No. 62/726,942, filed Sep. 4, 2018, the entirety of which is hereby incorporated by reference herein.

BACKGROUND

Field

Certain embodiments disclosed herein relate generally to fairings for vehicles that are removable.

Description of the Related Art

Fairings are commonly used on vehicles, such as large semi-trucks, and trailers, to improve the aerodynamics of the vehicle. These improved aerodynamics reduce fuel consumption and thereby reduce costs. However, fairings also make it more difficult to access components of the vehicle that are behind the fairings. These components need to be accessed during routine maintenance and inspection of the vehicle. They also sometimes need to be accessed on the side of the road. For instance, if a tire goes flat, the fairing next to, or surrounding, the tire will need to be removed to replace the tire. The removal of the fairing on the side of the road can be dangerous to the person removing the fairing. As another example, snow chains sometimes need to be added to the tires. Often times there is little room between the side of the vehicle and the traffic lanes. Current fairings are not capable of being easily removed while on the roadside. These fairings often contain complicated release mechanisms that require the use of tools to remove the fairing from the vehicle.

In some embodiments the fairing assembly disclosed herein solves these problems. It may provide a mechanism by which the fairing can be easily removed from the vehicle without the use of tools.

SUMMARY

In some embodiments the fairing assembly comprises a fairing, a mounting structure secured to a frame of a vehicle, a support coupled to the mounting structure, a lock removably coupled to the support, the fairing secured to the lock. In some embodiments the lock comprises a bracket configured to be releasably engaged with a notch in the support, a lever rotatably connected to the bracket, and a latch rotatably connected to the bracket, wherein a rotation of the lever causes a corresponding rotation of the latch such that the lock is moved between a locked configuration and an unlocked configuration and wherein in the locked configuration the bracket is engaged with the notch. In still other embodiments, in the unlocked configuration, the lock and the fairing are removable from the support without the use of tools. In still other embodiments, in the unlocked configuration the lock and the fairing are configured to be tilted relative to the support without removing the fairing or the lock from the support.

In some embodiments, the bracket further comprises, a bracket plate comprising an outward edge and a rearward edge, the bracket plate secured to the fairing at the outward edge. In other embodiments, a portion of the rearward edge of the bracket is flared such that when the lock is coupled to the support, the flared portion of the rearward edge extends away from the support.

In some embodiments, the latch comprises a ball detent. In some embodiments, the bracket comprises a whole to receive the ball detent when the lock is in the locked configuration.

In some embodiments, the fairing is shaped to fit around and between both wheels of a tandem axel.

In some embodiments, the support comprises multiple notches. In some embodiments, each notch comprises a support location, such as a mounting position. In some embodiments, the lock is slidable between mounting positions in the unlocked configuration. In some embodiments, when the lock is in the locked configuration in a mounting position, the bracket is engaged with the notch corresponding to that mounting position.

In some embodiments, a method for removing a fairing from a vehicle comprises moving a lever of a lock wherein the lock is secured to a fairing and wherein the lock comprises a latch and a bracket, said bracket configured to be releasably engaged with a support that is secured to a vehicle, wherein the movement of the lever rotates the latch such that the rotation of the latch causes the lock to move from a locked configuration to an unlocked configuration, wherein in the locked configuration the bracket is engaged with the support and in the unlocked configuration the bracket is released from the support, tiling the fairing and the locking mechanism relative to the support, and removing the fairing from the vehicle.

In some embodiments, the method of removing the fairing is performed without the use of tools.

In some embodiments, the bracket further comprises a hole configured to receive a ball detent on the latch such that the step of moving the lever causes the ball detent to be removed from the whole.

In some embodiments, a method for mounting a fairing to a vehicle comprises, placing a fairing that is coupled to a lock on a support secured to a vehicle, selecting a mounting position on the support, engaging the lock, wherein engaging the lock comprises moving a lever of the lock, the lever being configured to rotate a latch of the lock, the rotation of the latch causing the lock to be secured to the support and the fairing to be mounted to the vehicle in the mounting position.

In some embodiments, the method of mounting the fairing is performed without the use of tools.

In some embodiments, the method of mounting the fairing further comprises, selecting a mounting position from a plurality of mounting positions on the support, wherein each of the plurality of mounting positions is defined by a notch in the support, and the notch being configured to engage with the lock.

DETAILED DESCRIPTION

Figure 1:
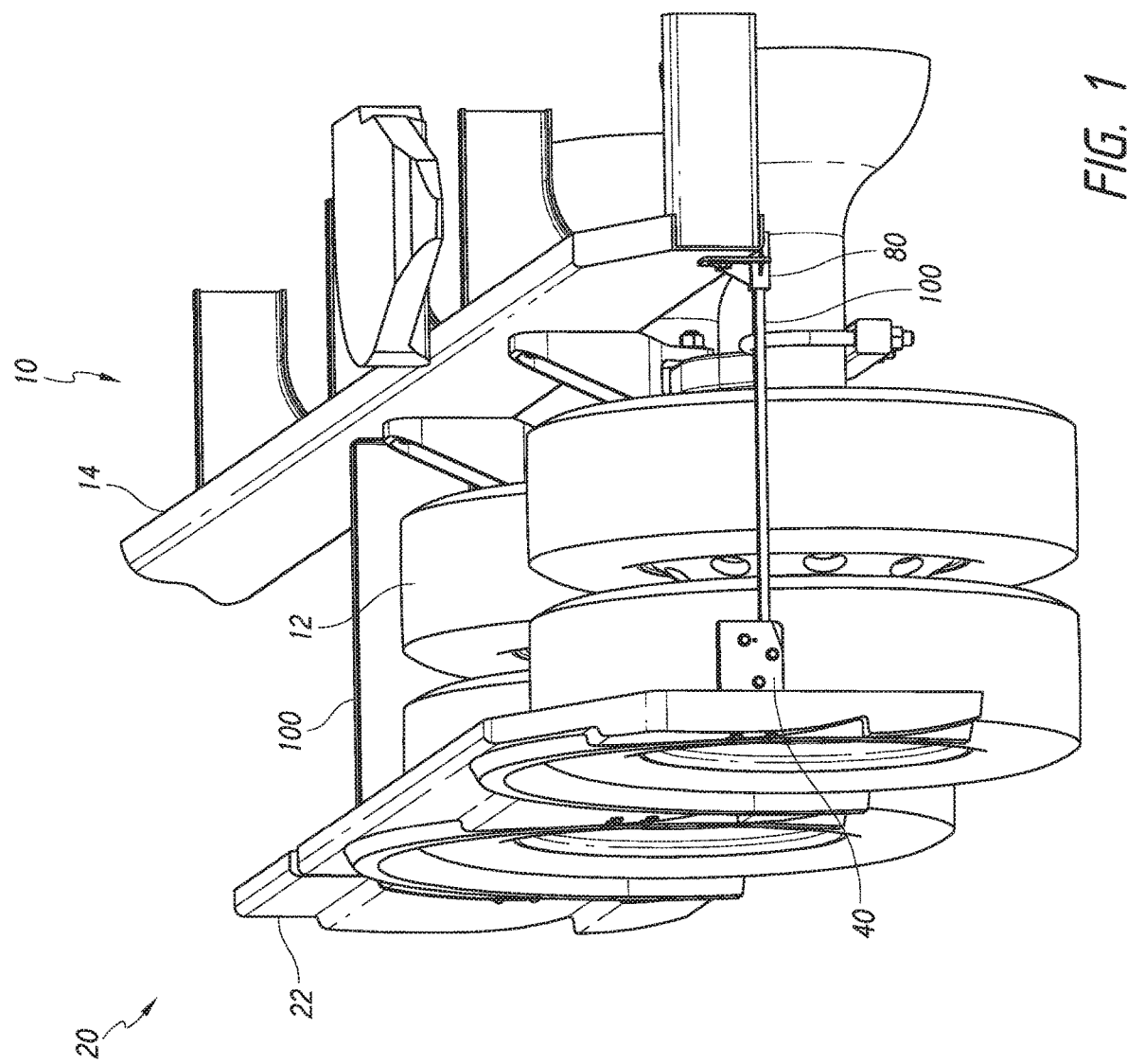
FIG. 1 is a perspective view of one embodiment of a fairing assembly on a vehicle.
Figure 2:
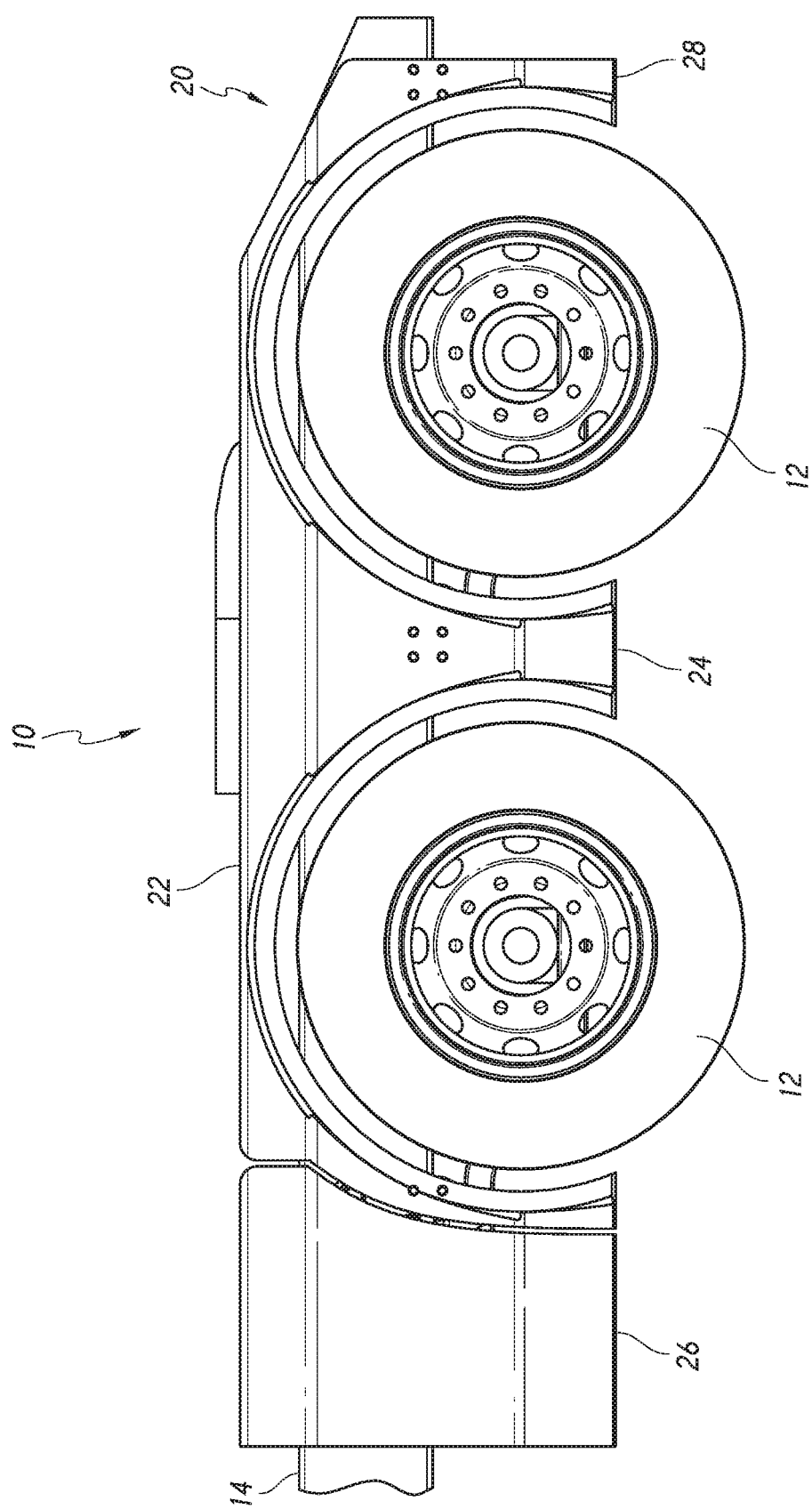
FIG. 2 is a side view of the fairing assembly of FIG. 1 on a vehicle.

In FIG. 1 and FIG. 2 there is shown a preferred embodiment of fairing assembly 20 mounted onto a vehicle 10. The fairing assembly 20 includes fairing 22 coupled with locking mechanism 40, support 100, and mounting structure 80. Mounting structure 80 is coupled to the frame 14 of the vehicle. The fairing 22 depicted in FIGS. 1 and 2 is configured to be mounted across both wheels 12 of a tandem axel wheel arrangement. A middle portion 24 of the fairing 22 may extend between the wheels 12. A skilled artisan will recognize that, in some embodiments, the fairing assembly 20 discussed herein is not limited to fairings for tandem axel wheel arrangements and can be used on other wheel arrangements.

Figure 3:
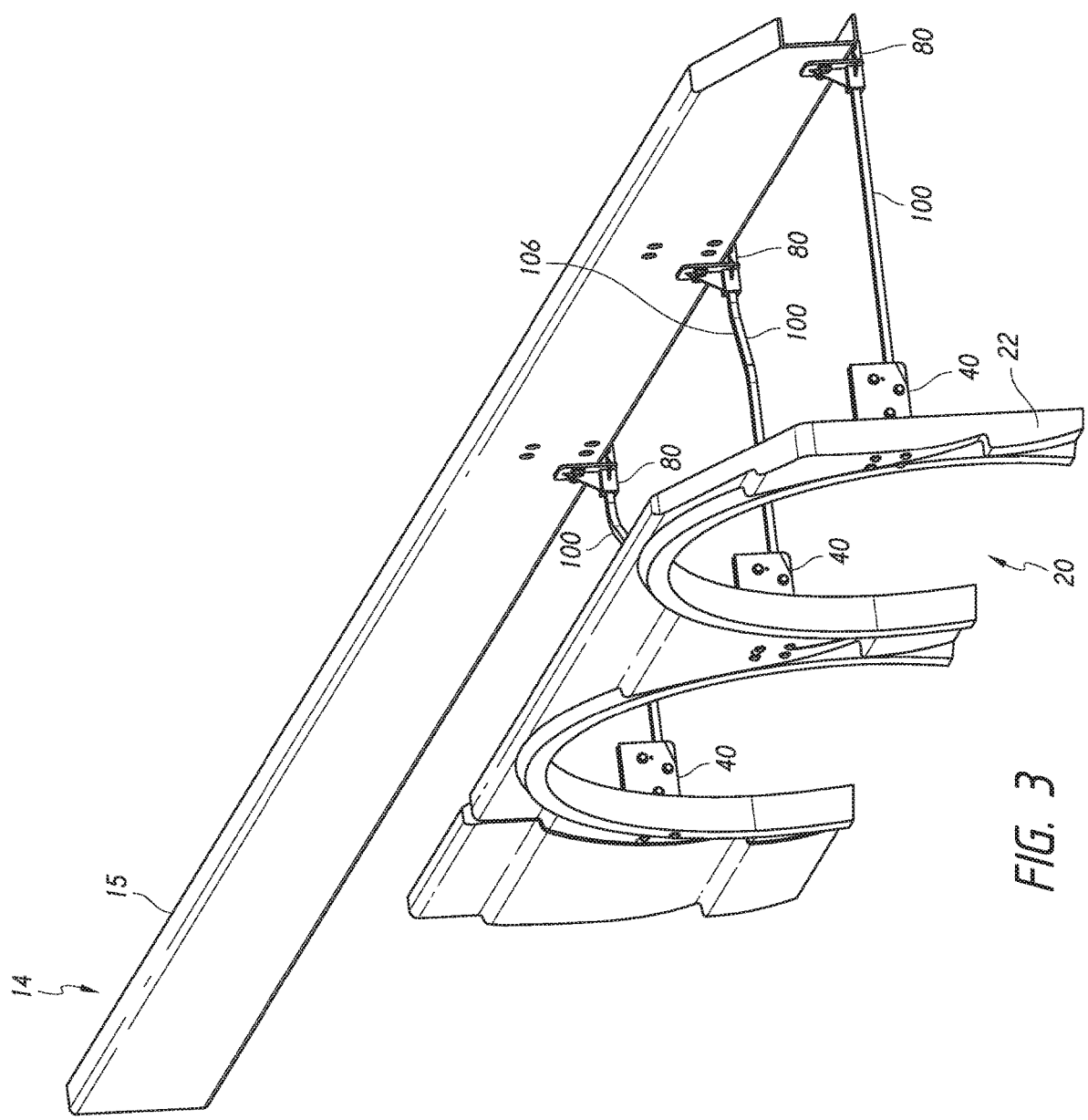
FIG. 3 is a perspective view of one embodiment of a fairing assembly.
Figure 4:
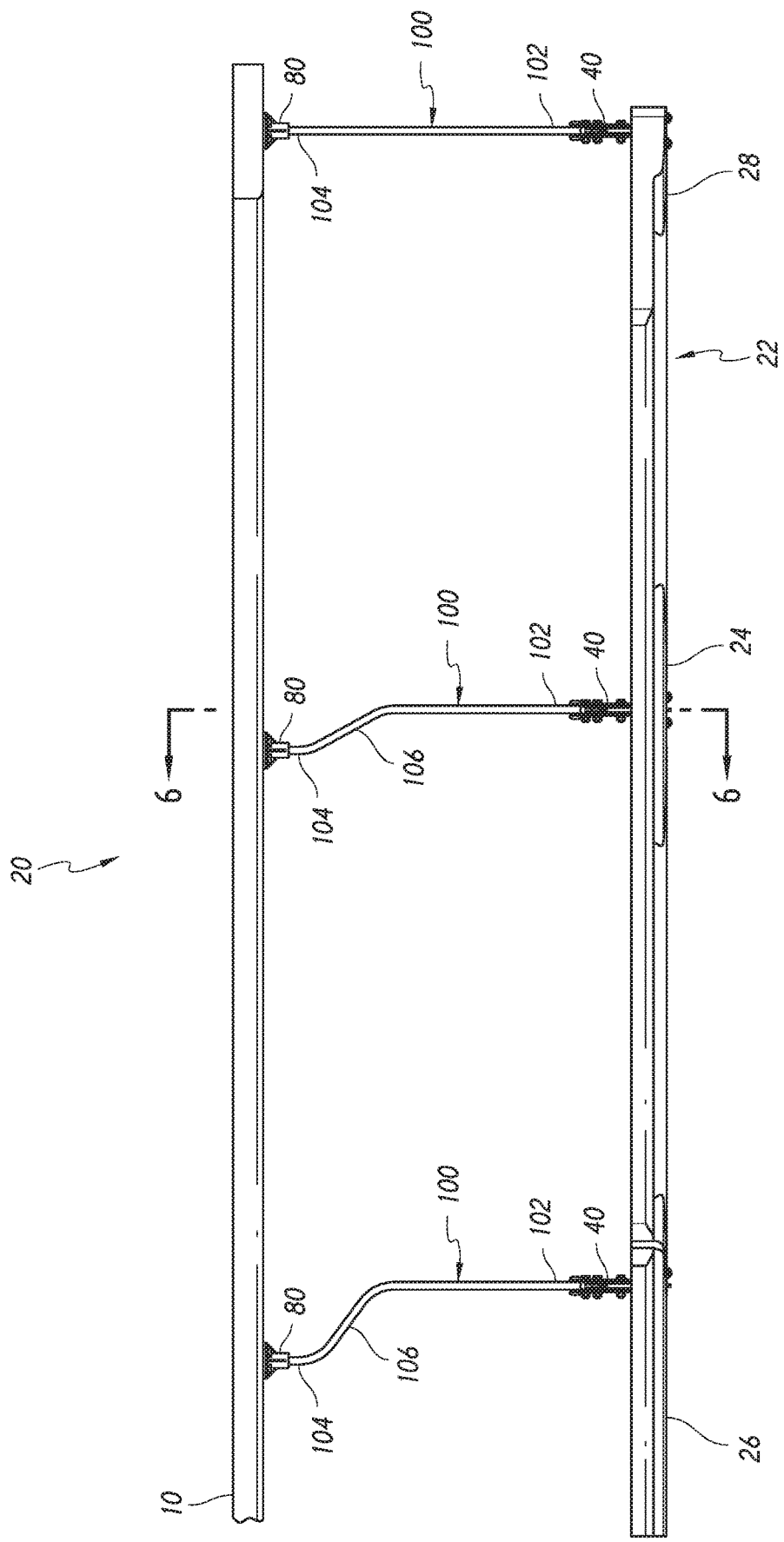
FIG. 4 is a top view of the fairing assembly of FIG. 3.
Figure 5:
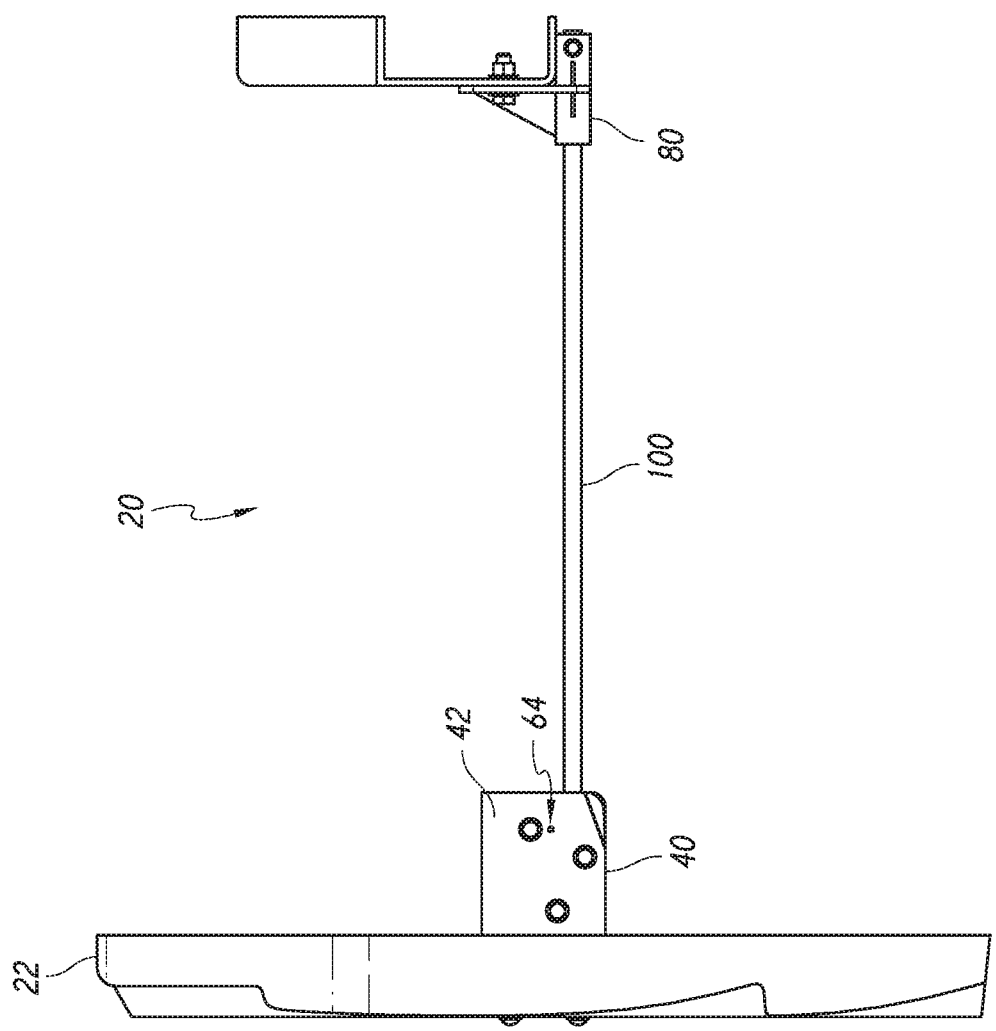
FIG. 5 is a side view of the fairing assembly of FIG. 3.

FIGS. 3 and 4 depict the embodiment of the fairing assembly 20 depicted in FIGS. 1 and 2 but with the wheels 12 of the vehicle 10 removed. In the preferred embodiment, the fairing assembly 20 includes three sets of locking mechanisms 40, supports 100, and mounting structures 80. A skilled artisan will recognize that any number of locking mechanism 40, support 100, and mounting structures 80 sets can be used. The number will depend on, among other things, the particular vehicle 10 and the length and design of the fairing 22. In FIG. 3, fairing 22 is coupled to each locking mechanism 40 at a different point on the fairing 22. In the preferred embodiment, the locking mechanisms 40 are mounted at forward portion 28, middle portion 24, and rearward portion 26 of fairing 22. In other embodiments, different configurations are possible. Extending from each locking mechanism 40 is a support 100. In the preferred embodiment, the locking mechanism is removably coupled to outward end 102 of support 100, as described below. In other embodiments, the support 100 and locking mechanism 40 are fixedly coupled. In other embodiments the locking mechanism 40 is coupled to different portions of the support 100. In the preferred embodiment, at least one of supports 100 contains a bend 106 to accommodate various components of vehicle 10. In the preferred embodiment, the inward end 104 of support 100 is removably coupled to a mounting structure 80, as described below. In other embodiments, the inward end 104 of support 100 is fixedly coupled to mounting structure 80. Mounting structure 80 is coupled to the frame 14 of vehicle 10. In FIG. 3, the frame 14 is depicted as incorporating a C-channel 15, but numerous other frame shapes are compatible with mounting structure 80.

Figure 6:
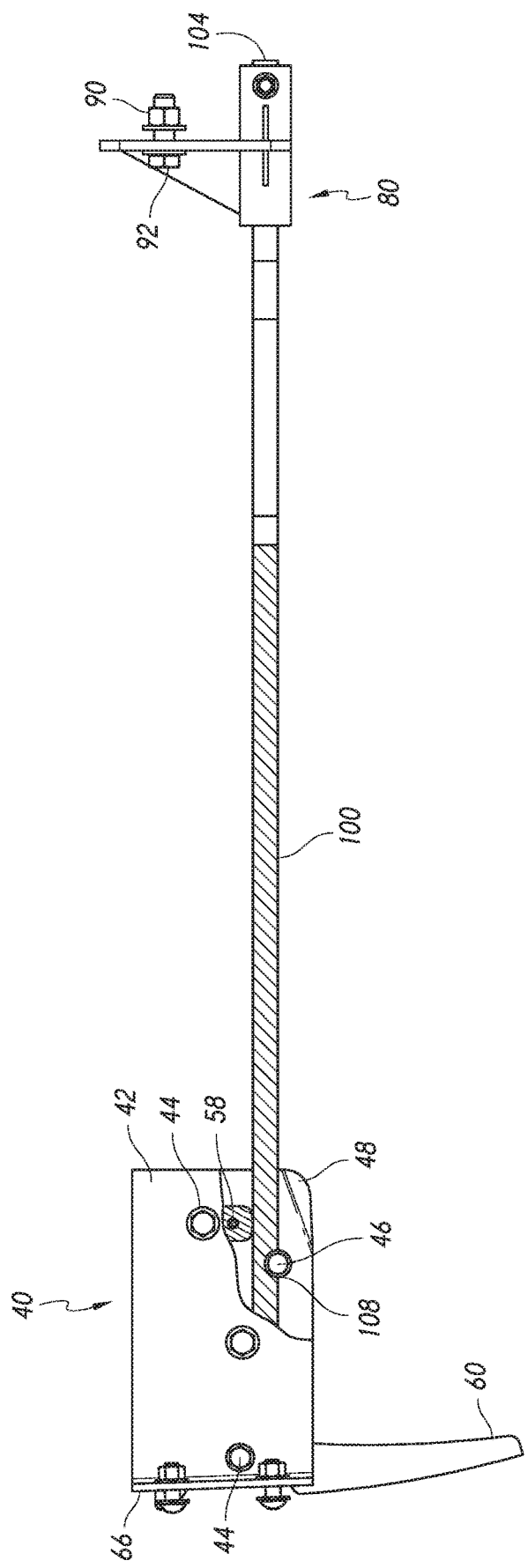
FIG. 6 is a cross-sectional view of one embodiment of a locking mechanism of the fairing assembly taken along line 6-6 of FIG. 4.

FIG. 6 depicts a one embodiment of a locking mechanism 40, in a locked position. In the preferred embodiment, the locking mechanism 40 is bounded by two bracket plates 42. However, embodiments with only one bracket plate 42 are also possible. In the preferred embodiment, the bracket plates 42 are mirror images of one another. The bracket plates 42 preferably include a flange 66 that is configured to mate with and be secured to a portion of the fairing 22. The bracket plates 42 are secured together via bolts 44 and mounting bolt 46. Support 100 is shaped to be positioned between bracket plates 42. In some embodiments, the bracket plate 42 comprises an inclined or flared portion 48.

In the preferred embodiment, the flared portion 48 guides the support 100 into the locking mechanism 40 when the fairing 22 and the locking mechanism 40 are mounted on the support 100. The mounting bolt 46 is shaped and positioned such that it mounts within a semi-circular notch 108 on the outward end 102 of the support 100 when the locking mechanism 40 and fairing 22 are mounted and locked to support 100. Each notch 108 comprises a support location and/or mounting position for fairing assembly 20. In the preferred embodiment, there is only one mounting position, and only one notch 108 in each support 100. However, a skilled artisan would understand that it is possible to design each support 100 with multiple notches to create multiple mounting positions. Such a configuration would allow the fairing 22 to be adjustable mounted at multiple distances from the frame 14 of the vehicle 10. In some embodiments, the fairing 22 is configured such that it can be mounted in notches 108 in each support 100 with each notch 108 being a different distance from the frame 14 of the truck. This configuration allows the fairing 22 to be mounted at an angle that directs airflow towards the rear of the vehicle and increases aerodynamics. In still other embodiments, the fairing 22 is configured to be mounted at multiple mounting positions such that the entire fairing 22 is adjustable relative to the wheels 12 of the vehicle. This configuration allows for the sale of a single size of fairing assembly 20 for multiple types of vehicles 10.

Figure 7:
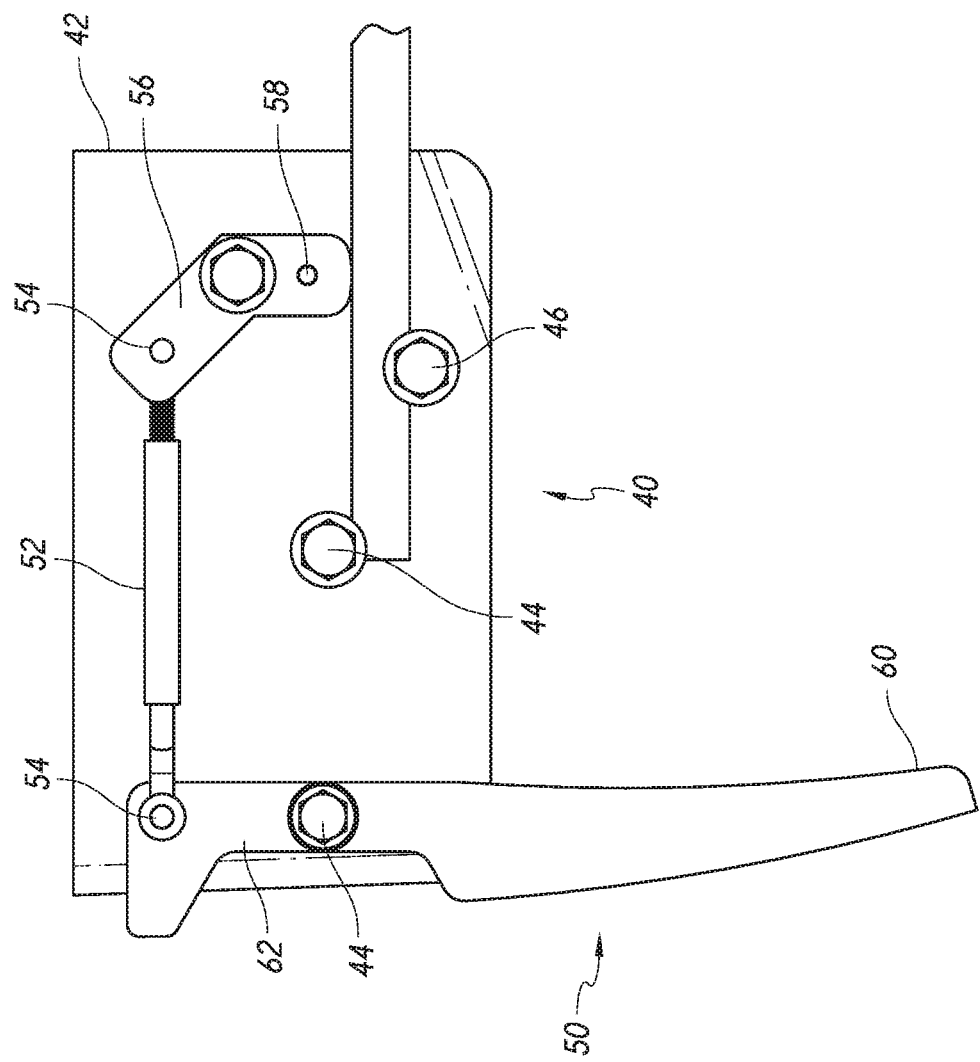
FIG. 7 is a side view of the locking mechanism of FIG. 6 with one bracket plate removed.

FIG. 7 depicts an embodiment of locking mechanism 40 mounted on support 100, with one bracket plate 42 removed to show the internal components of the locking mechanism 40. In the preferred embodiment, the locking mechanism includes a lever 50 that is pivotably coupled to a rod 52 which is pivotably coupled to latch 56. In the preferred embodiment, lever 50 is rotatably mounted onto one of the bolts 44. In other embodiments, the lever 50 is mounted on a separate pin (not shown) that spans bracket plates 42. In the preferred embodiment, the lever 50 contains a handle portion 60 that extends downward beyond the lower edges of bracket plates 42. In other embodiments, the handle portion 60 extends upward. In the preferred embodiment, at least the handle portion 60 of the lever 50 is accessible through an access hole 30 in fairing 22. In other embodiments, the handle portion 60 of the lever 50 protrudes through fairing 22 and no access hole 30 is needed. In the preferred embodiment, lever 50 also includes an actuating portion or working portion 62 extending opposite of the handle portion 60. In other embodiments, the handle portion 60 and the working portion 62 extend in the same direction. The working portion 62 includes a pivotable connection 54 with a rod 52. In the preferred embodiment, the rod 52 is an adjustable length threaded rod. In other embodiments, the rod 52 has a fixed length. The rod 52 is pivotably connected to a latch 56. The latch 56 can take numerous forms. In the preferred embodiment, the latch 56 is bent at an angle. In other embodiments, the latch 56 is straight. The latch 56 is rotatably coupled to the bracket plates 42 via one of the bolts 44. The latch 56 is also pivotably connected the rod 52. In the preferred embodiment, the latch 56 contains a ball detent 58. The ball detent 58 is configured to be engaged with a space 64, such as via a through hole or recess, in one or both bracket plates 42.

The operation of locking mechanism 40 will now be described. In the locked position, mounting bolt 46 is positioned within notch 108 on support 100. Likewise, ball detent 58 is engaged with space 64 on bracket plates 42. These structures secure the fairing 22 to the support 100. Unlocking the fairing involves the following steps. First, a user pulls (or pushes depending on the configuration) the handle portion 60 of the lever 50. This causes the lever 50 to rotate around the axis of the bolt 44 so that the lever 50 transmits inward (relative to the vehicle) motion to the rod 52. The inward motion of the rod is transferred to the latch 56 via a pivotal connection 54 between the rod 52 and the latch 56. This motion causes the latch 56 to rotate about the bolt 44, which disengages the ball detent 58 from the space 64. The rotation of latch 56 combined with gravity causes the fairing 22 to lower slightly towards the ground, which causes the mounting bolt 46 to withdraw from the notch 108. In this unlocked position, a portion of the latch 56 is resting on the support 100. In some embodiments, one of the bolts 44 is also resting on the support 100 to prevent the fairing from tipping off of the support 100 due to a gravitational moment. Generally, the fairing 22 is lightweight enough that in the unlocked position it will not slide off of the support 100 due to a gravitational moment. In the unlocked position, the fairing 22 and locking mechanism 40 can be moved, for example vertically tilted and/or pivoted, relative to the support 100. One of ordinary skill in the art will appreciate that vertically tilting the fairing 22 relative to the support 100 causes a top portion of the fairing 22 to move inward relative to a vertical plane and a bottom portion of the fairing 22 to move outward relative to the vertical plane. Pivoting the fairing 22 relative to the support 100 can provide greater access to the wheels 12 of the vehicle 10. In the preferred embodiment, the fairing 22 can tilt up to 15 degrees relative to the support 100. However, in other embodiments, greater or lesser maximum degrees of tilt are possible (e.g., less than 10 degrees, less than 20 degrees, less than 30 degrees, etc.). The available degree of tilt is a function of at least the relative vertical and horizontal positions of the latch 56, bolts 44, and mounting bolt 46. In some embodiments, the fairing 22 and locking mechanism 40 can be secured to the support 100 in a tilted position.

Once in the unlocked position, the fairing 22 and the locking mechanism 40 can be removed from the support 100. In the preferred embodiment, the fairing 22 and locking mechanism 40 can be slid off the support 100 once in the unlocked position. In some embodiments, the fairing 22 can be lifted such that the lower edges of bracket plates 42 clear the support 100 before the fairing 22 and locking mechanism 40 are removable. Once the fairing 22 is removed, the user is afforded easy access to the wheels 12, frame 14, or other components 16 of the vehicle 10 that would otherwise be obscured by the fairing 22. Removing the fairing 22 also allows the fairing 22 to be repaired or replaced without having to remove the supports 100 or mounting structure 80 from the frame 14 of the truck. This advantageously decreases repair time. Another advantage is that, in the preferred embodiment, this unlocking and removal process can be performed without the use of any tools. Other embodiments are contemplated wherein tools are used.

Mounting and securing the fairing 22 involves substantially the reverse steps as unlocking and removing the fairing 22. The fairing 22 is positioned such that the support 100 extends through at least a portion of the locking mechanism 40, preferably between the mounting bolt 46 and latch 56. The fairing 22 is adjusted such that mounting bolt 46 is below the desired notch 108 and the latch 56 is resting on support 100. The handle portion of the lever 50 is then pressed inward (relative to the vehicle) causing the latch 56 to rotate such that the ball detent 58 engages with space 64 of the bracket plates 42. The rotation of the latch 56 urges the locking mechanism 40 and fairing 22 upward such that the mounting bolt 46 is received within the notch 108. Preferably, the ball detent 58 engages the space 64 at approximately the same time that the rotation of the latch 56 causes the mounting bolt 46 to be received within the notch 108.

In embodiments with more than one locking mechanism 40, such as those depicted in FIGS. 1 through 5, the locking mechanisms 40 can be locked and/or unlocked in any sequence. In the preferred embodiment, the locking mechanisms 40 each lock and/or unlock separately. In other embodiments, the locking mechanisms 40 are connected by known electronic or mechanical means, (e.g., synchronized motors, hydraulics, or cables) such that locking or unlocking any locking mechanism 40 locks or unlocks all the locking mechanisms 40. In such an embodiment, at most one locking mechanism 40 includes a handle portion 60 of lever 50 for the user to manipulate. In some embodiments, no locking mechanism is provided with a handle portion 60 and the locking mechanisms 40 are locked and/or unlocked by use of a remote control, button, and/or other means of activating motors or small hydraulic pistons.

Figure 8:
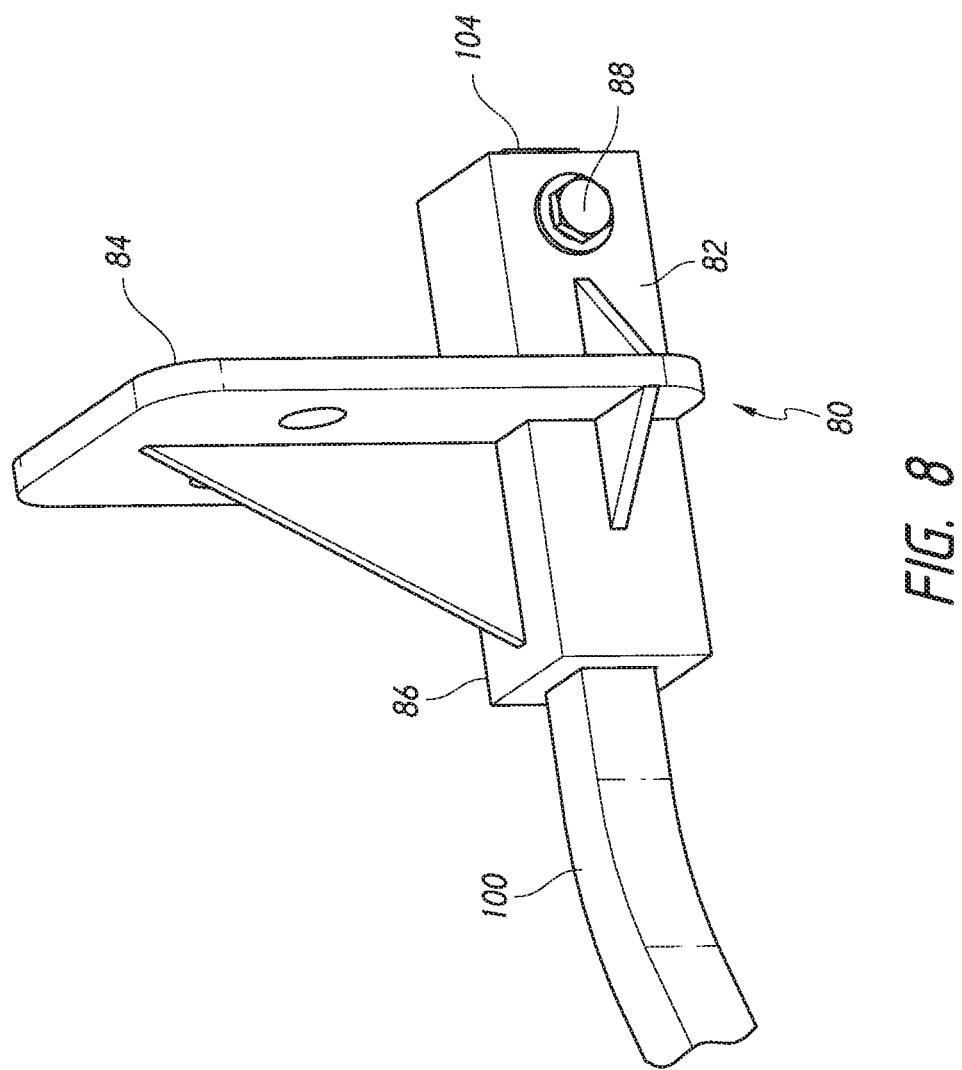
FIG. 8 is a perspective view of one embodiment of a mounting structure of a fairing assembly.

FIG. 8 shows a mounting structure 80 of one embodiment of a fairing assembly 20. Mounting structure 80 generally includes a frame 82 and a mounting bracket 84. In some embodiments, the frame 82 and mounting bracket 84 are integral components. In other embodiments, the frame 82 and mounting bracket 84 are separate pieces that are connected by a known method such as welding or via bolts. In the preferred embodiment, the frame 82 contains a tube 86 configured to receive the inward end 104 of support 100. In some embodiments, the tube 86 is open on both ends such that the inward end 104 of the support 100 can pass entirely through. This allows the user to adjust the desired position of the fairing assembly 20 inward/outward relative to the position of the wheels 12 and frame of the vehicle 10. This adjustability is desirable, for example, in embodiments wherein the support 100 contains one notch 108 and thus only one mounting position for fairing 22. This adjustability may also be desirable, for example, in the event the user wants to fine tune the possible mounting position at distances smaller than the distance between the notches 108. In other embodiments, the tube 86 is closed on one end such that the inward end 104 of the support 100 abuts the closed end of tube 86 when the support 100 is in the desired position.

In the preferred embodiment there is a securement mechanism 88 on the frame 82. The securement mechanism 88 holds the support 100 in place within tube 86. In some embodiments the securement mechanism comprises a bolt on each side of the frame 82 such that when tightened, the bolts exert a tangential force on the support 100. This force prevents the support 100 from being removed from the tube 86 during normal operational conditions. In other embodiments, the support 100 contains one or more holes (not shown) longitudinally spaced along the inward end 104. The holes are shaped to receive the securement mechanism 88. In such embodiments, the securement mechanism 88 can comprise a single nut and bolt than are placed through the tube 86 and support 100, and are secured on opposite sides of the frame 82. In other embodiments, the securement mechanism 88 comprises a pin that is placed through the tube 86 and support 100. In still other embodiments, the pin is attached to the frame 82 and is biased via a spring in a position that holds support 100 in place. It is contemplated that numerous other known devices can hold the support 100 in place in the tube 86 and the mounting assembly 80 disclosed herein is readily adaptable to them.

The mounting bracket 84 is adapted to be connected to the frame 14 of the vehicle 10. Preferably the mounting bracket 84 is connected to the frame 14 via a set of nuts 90 and bolts 92. In other embodiments, the mounting bracket 84 can be welded to the frame. In still other embodiments, the mounting bracket 84 includes a clamp that secures it to the frame.

From the foregoing description, it will be appreciated that inventive fairing assemblies and installation methods are disclosed. While several components, techniques and aspects have been described with a certain degree of particularity, it is manifest that many changes can be made in the specific designs, constructions and methodology herein above described without departing from the spirit and scope of this disclosure.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount. If the stated amount is 0 (e.g., none, having no), the above recited ranges can be specific ranges, and not within a particular % of the value. For example, within less than or equal to 10 wt./vol. % of, within less than or equal to 5 wt./vol. % of, within less than or equal to 1 wt./vol. % of, within less than or equal to 0.1 wt./vol. % of, and within less than or equal to 0.01 wt./vol. % of the stated amount.

Some embodiments have been described in connection with the accompanying drawings. The figures are drawn to scale, but such scale should not be limiting, since dimensions and proportions other than what are shown are contemplated and are within the scope of the disclosed inventions. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims.

What is claimed is:

1. A fairing assembly comprising:
    a fairing;
    a mounting structure configured to attach to a frame of a vehicle;
    a support coupled to the mounting structure; and
    a lock removably coupled to the support, the lock comprising:
        a bracket configured to releasably engage a notch in the support;
        a lever rotatably connected to the bracket; and
        a latch rotatably connected to the bracket;
    wherein a rotation of the lever causes a rotation of the latch which causes the lock to move between a locked configuration and an unlocked configuration;
    wherein when the lock is in the locked configuration, the bracket is engaged with the notch and the fairing is secured to the lock; and
    wherein when the lock is in the unlocked configuration, the lock and the fairing are removable from the support without the use of tools.

2. The fairing assembly of claim 1, wherein when the lock is in the unlocked configuration, the lock and the fairing are configured to tilt relative to the support without removing the fairing or the lock from the support.

3. The fairing assembly of claim 1, wherein the bracket comprises a bracket plate defining an outward edge and a rearward edge, the bracket plate configured to attach to the fairing at the outward edge, wherein the rearward edge defines a flared portion such that when the lock is coupled to the support, the flared portion of the rearward edge extends away from the support.

4. The fairing assembly of claim 1, wherein the latch comprises a ball detent and the bracket comprises a hole configured to receive the ball detent when the lock is in the locked configuration.

5. The fairing assembly of claim 1 wherein the support comprises a plurality of notches, each of the plurality of notches defining one support location of a plurality of support locations, the lock being slidable between the plurality of support locations when the lock is in the unlocked configuration, and wherein when the lock is in the locked configuration, the bracket is engaged with the notch corresponding to one of the plurality of support locations.

6. A method for removing a fairing from a vehicle comprising:
   moving a lever of a lock secured to a fairing on a vehicle, the lock comprising a latch and a bracket, the bracket releasably engaged with a support that is secured to the vehicle;
      wherein moving the lever causes the latch to rotate, thereby causing the lock to move from a locked configuration to an unlocked configuration;
      wherein moving the lock from the locked configuration to the unlocked configuration causes the bracket to disengage the support;
   tilting the fairing and the lock relative to the support; and
   removing the fairing from the vehicle.

7. The method of claim 6, wherein the method is performed without the use of tools.

8. The method of claim 6, wherein moving the lever of the lock causes a ball detent on the latch to be removed from a hole in the bracket.

9. A method for mounting a fairing to a vehicle comprising:
   placing a fairing that is coupled to a lock on a support secured to a vehicle, the lock comprising a lever and a latch;
   selecting a support location on the support;
   engaging the lock, wherein engaging the lock comprises moving the lever of the lock, the lever being configured to rotate the latch of the lock,
   wherein a rotation of the latch causes the lock to be secured to the support, thereby mounting the fairing to the vehicle in the selected support location.

10. The method of claim 9, wherein the fairing is mounted to the vehicle without the use of tools.

11. The method of claim 9, wherein selecting a support location on the support comprises selecting the support location from a plurality of support locations on the support, wherein each of the plurality of support locations is defined by a notch in the support, each notch being configured to engage with the lock.

\* \* \* \* \*